May 2, 1933. W. LENSCHOW 1,907,074
APPARATUS FOR GRADING AND TESTING EGGS
Filed Nov. 23, 1931 2 Sheets-Sheet 1
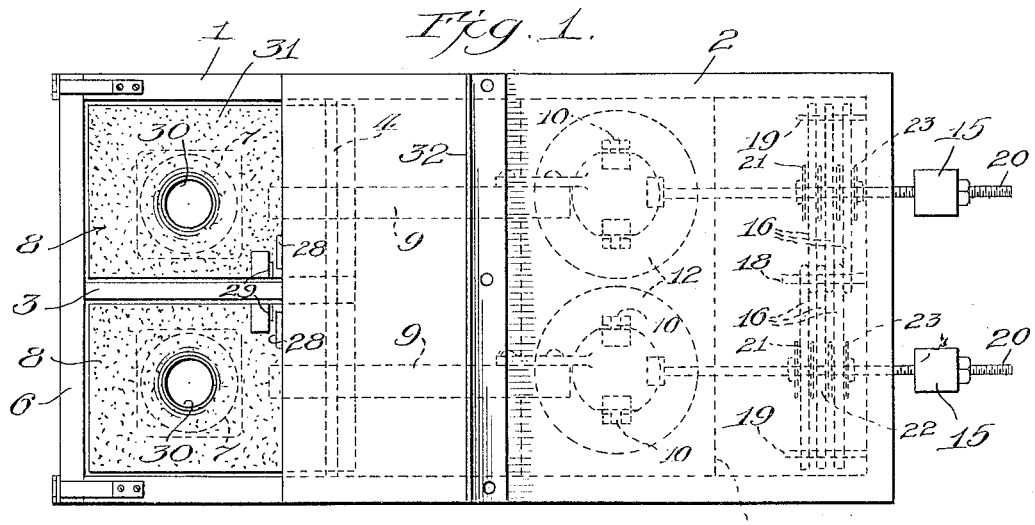
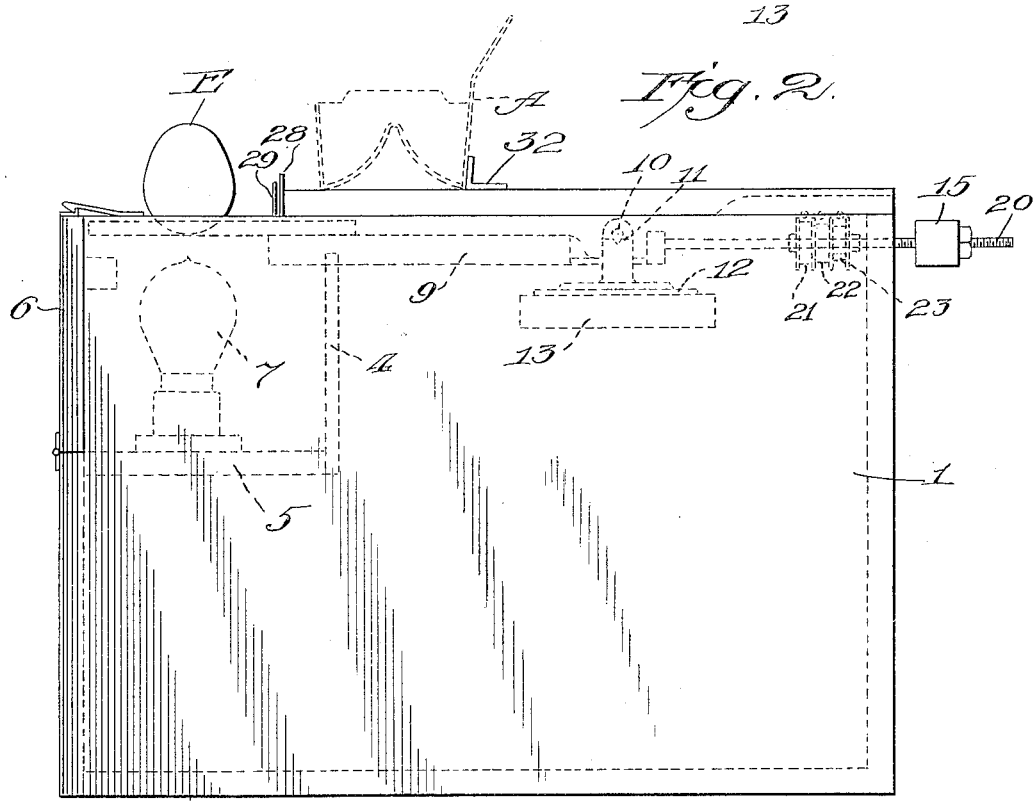
Inventor:
Walter Lenschow,
By Wm. F. Freudenreich,
Atty.

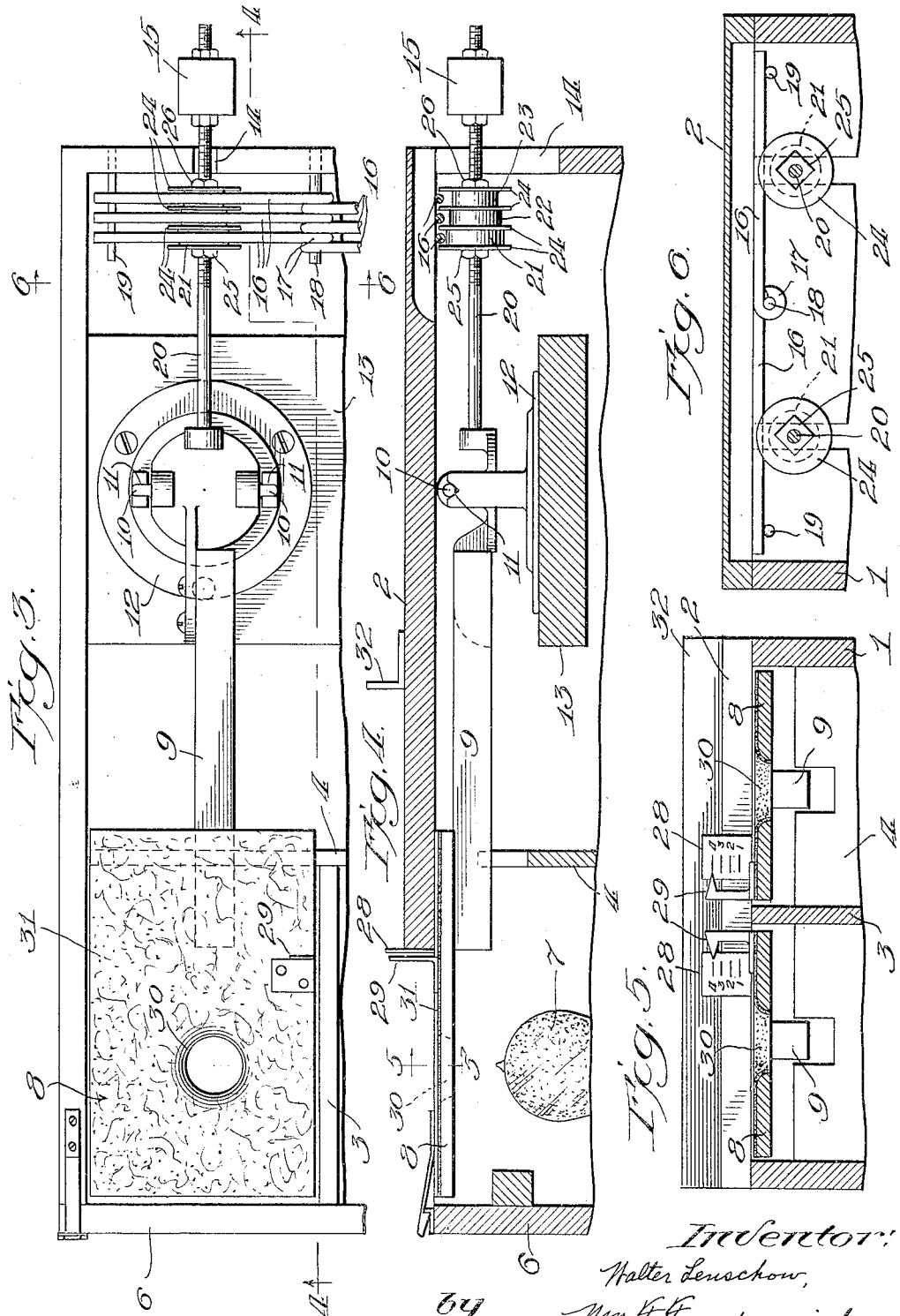

UNITED STATES PATENT OFFICE

WALTER LENSCHOW, OF SYCAMORE TOWNSHIP, DE KALB COUNTY, ILLINOIS

APPARATUS FOR GRADING AND TESTING EGGS

Application filed November 23, 1931. Serial No. 576,657.

The present invention has for its object to produce a simple, novel and inexpensive machine or apparatus that will weigh individual eggs while they are being candled.

Specifically considered, my invention may be said to have for its object to produce a simple and novel machine or apparatus that will enable a user accurately to grade and properly to candle eggs, and be sufficiently inexpensive to permit its purchase by those who are handling eggs in comparatively small quantities.

A further object of the present invention is to produce a simple and novel egg-grading and candling machine or apparatus that will make it easy for a user to grade and test eggs as they are being transferred from an egg case, for example, to egg cartons.

In carrying out my invention, I employ a simple weighing device having a scale pan provided with an opening into which an egg may be set. Housed in a chamber below and closed at the top by the scale pan is a lamp or other source of light for illuminating an egg carried by the scale pan while the egg is being weighed. There are preferably two complete weighing and candling units in each apparatus or machine, whereby the operator may employ both hands at the same time. Furthermore, the structure is preferably so proportioned that the scale pans are about level with the top of an egg case standing beside the apparatus. Furthermore, the top of the apparatus preferably has a width about equal to the length of a two by six egg carton; whereby, when such a carton is set on top of the structure, in the vicinity of the scale pans, it is a simple matter to deposit in the carton the eggs that have been weighed and tested.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of an apparatus or device embodying the present invention; Fig. 2 is a side elevation showing, in dotted lines, an egg carton positioned thereon and showing also, an egg in the act of being weighed; Fig. 3 is a top plan view, on a larger scale than Figs. 1 and 2, of one-half of the apparatus with the top plate removed; Fig. 4 is a section on line 4—4 of Fig. 3; Fig. 5 is a section on line 5—5 of Fig. 4; and Fig. 6 is a section on line 6—6 of Fig. 3.

Referring to the drawings, 1 represents a rigid structure, base or frame which, in the arrangement shown, takes the form of a box-like member about as high as an egg case and about as wide as the length of a two by six egg carton. The top wall 2, of the box terminates at some distance from the front end so as to leave the front portion of the box open at the top. In the upper front part of the box are two compartments produced by a short central longitudinal partition 3 and a transverse partition 4. Each compartment may also have a bottom wall 5. The upper portion of the front of the box is shown as taking the form of a door 6 that may be opened to give access to the compartments. In the center of each compartment is an electric light bulb 7. The top of each of the two compartments is closed by means of a lid, platform or scale pan 8 mounted on the front end of a scale beam 9 extending from front to rear of the structure. Each of the two scale beams is shown as being provided with a pair of trunnions 10, 10 resting in open bearings, 11, 11 in a suitable saddle 12 fixed within the box, preferably by being secured to a cross piece 13 in the box. The rear end of each scale beam preferably extends out through a slot 14 in the rear wall of the box and has thereon an adjustable weight 15.

It is not necessary that eggs be accurately weighed but only that the weighing means shall indicate in which of several classes or grades of weights a particular egg falls. The main weights on the scale beam may be so adjusted that the scale beams will not tilt when light weight eggs are laid on the scale pans but will tilt under the weight of the lowest grade of eggs. Additional weights may be provided to be picked up successively as the weighted ends of the scale beams rise. Then, if an egg is heavy enough to cause a scale beam to tilt, the tilting will proceed until the first added weight is engaged whereupon, if the egg is not heavy enough to enter the second grade, the beam will come to rest. However, if the egg be heavy, the first additional weight will be picked up and the scale beam will continue to rise until the next weight is lifted. By this means, depending on the distance to which the weighted end of a scale beam rises when the corresponding pan is loaded, the user is immediately apprised of the grade or class to which the egg belongs.

In the arrangement shown, the auxiliary weights are in the form of wires 16, of which three are shown for each scale beam. Each of these wires has at one end an eye 17 through which passes a pin or rod 18 extending longitudinally of the apparatus between and parallel with the scale beams. Three of the wires extend toward the right, and the other three toward the left, across the corresponding scale beams, and are supported at their free ends on stationary, horizontal posts or pins 19. In the arrangement shown, the rear end of each scale beam is in the form of a screw-threaded rod carrying not only the main weight 15, but also a step arrangement to engage with the overlying wires. Each step arrangement may consist conveniently of a series of thick washers 21, 22, 23 differing in diameter, one from another, and thin spacing washers 24 of larger diameter being placed between the other washers and at each end of the series; the end-most thin washers being engaged by nuts 25 and 26 on the screw-threaded rod. The parts are so proportioned that each of the three wires lie directly above one of the thick washers on the corresponding scale beam. Therefore if the wires normally lie in the same horizontal plane, they will be picked up one after another as the scale beam rises. It will of course be understood that while I have shown three wires and three steps in connection with each scale beam, any desired number of wires and steps may be employed, depending upon the number of grades or classes to be indicated.

In order that the operator may know instantly the weight of any particular egg, I prefer to provide each weighing device with an indicator of any usual or suitable kind. In the arrangement shown, there is fixed to the front edge of the top wall 2 of the structure, near the center and above each scale pan, a vertical graduated scale 28. On each scale pan is fixed a pointer 29 cooperating with the corresponding scale. The graduation of the scale corresponds to the several positions of rest that the scale beam may have, depending upon the weight of the eggs by which it is tilted. Therefore each graduation represents a particular grade of egg.

The scale pans may be simple flat panels each having in the center an opening 30 directly above the underlying light bulb. The openings 30 are made large enough to permit the passage of a large volume of light and also large enough to form effective seats for the eggs; each opening being therefore made comparatively large, but not large enough to permit even a small egg to drop down through the same. Each scale pan is preferably faced on the upper side with a layer 31 of felt or the like; this felt being carried down into the opening and forming a cushion for the eggs.

It will therefore be seen that when an egg is set on a scale pan the operator is able to examine it by the strong light passing through the same from underneath and, while this examination is taking place, the egg is being automatically graded.

As heretofore stated, the width of the structure is preferably about the same as the length of a two by six egg carton. Therefore such a carton may be set on top of the frame or box, toward the front, as indicated in dotted lines at A in Fig. 2 and be in a position that will permit the eggs to be easily and quickly placed in the same after having been graded and tested. In order that the carton may always be properly located on the structure, I prefer to place on top of the top wall 2, a transverse ledge 32 far enough back from the front edge of the top wall to permit a carton to rest on the top wall in front of and in engagement with the ledge.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A combined egg-candling and grading apparatus comprising a support having a chamber open at the top, a cover for the top of said chamber movable up and down in the chamber, said cover having an opening therein to receive an egg and seat it on the cover, a source of light in the chamber below said cover, and means connected to the cover to weigh an egg resting thereon.

2. A combined egg-candling and grading apparatus comprising a structure of approximately the same height as an egg case, a vertically movable scale pan in said structure at the top and at the front end thereof, said scale pan having an opening therein to receive and seat an egg, a source of light in said structure directly below said scale pan, and means connected to said scale pan to weigh an egg seated in the opening therein.

3. A combined egg-candling and grading apparatus comprising a structure of approximately the same height as an egg case, a vertical movable scale pan in said structure at the top and at the front end thereof, said scale pan having an opening therein to receive and seat an egg, a source of light in said structure directly below said scale pan, means on top of the said structure to support an egg carton above and directly behind said scale pan, and means connected to said scale pan to weigh an egg seated in the opening therein.

4. A combined egg-candling and grading apparatus comprising a structure of approximately the same height as an egg case and approximately as wide as the length of a two by six egg carton, two vertically-movable platforms in the top of said structure at the front end, each platform having an opening therethrough to receive an egg and seat it, lights below said openings, a stationary platform at the top of the structure in position to support an egg carton in the vicinity of said movable platform, and means connected to said movable platforms to weigh eggs seated thereon.

5. A combined egg candling and grading apparatus comprising a box-like structure open at the top, a weighing device having a scale beam forming a cover for the open top of said structure while permitted to move up and down, said beam having an opening to receive and seat an egg, and a source of light within said box-like structure underneath the scale beam.

In testimony whereof, I sign this specification.

WALTER LENSCHOW.